United States Patent
Doi et al.

(10) Patent No.: US 9,102,769 B2
(45) Date of Patent: Aug. 11, 2015

(54) FLUORINE-CONTAINING ELASTOMER COMPOSITION AND MOLDED ARTICLE MADE OF SAME

(71) Applicant: DAIKIN INDUSTRIES, LTD., Kita-ku, Osaka-shi (JP)

(72) Inventors: Michiko Doi, Settsu (JP); Mitsuhiro Otani, Settsu (JP)

(73) Assignee: DAIKIN INDUSTRIES, LTD., Osaka-shi (JP)

( * ) Notice: Subject to any disclaimer, the term of this patent is extended or adjusted under 35 U.S.C. 154(b) by 0 days.

(21) Appl. No.: 13/913,300

(22) Filed: Jun. 7, 2013

(65) Prior Publication Data

US 2013/0267662 A1    Oct. 10, 2013

Related U.S. Application Data

(62) Division of application No. 13/054,325, filed as application No. PCT/JP2008/072600 on Dec. 5, 2008, now Pat. No. 8,481,140.

(30) Foreign Application Priority Data

Jul. 18, 2008  (JP) ................. 2008-186997

(51) Int. Cl.
| C08K 3/00   | (2006.01) |
| C08F 14/22  | (2006.01) |
| C08K 5/13   | (2006.01) |
| C08K 5/136  | (2006.01) |
| C09K 3/10   | (2006.01) |
| F16L 11/06  | (2006.01) |

(52) U.S. Cl.
CPC .............. *C08F 14/22* (2013.01); *C08K 3/0016* (2013.01); *C08K 5/13* (2013.01); *C08K 5/136* (2013.01); *C09K 3/1009* (2013.01); *F16L 11/06* (2013.01); *Y10T 428/139* (2015.01); *Y10T 428/1372* (2015.01); *Y10T 428/1379* (2015.01); *Y10T 428/1386* (2015.01); *Y10T 428/1397* (2015.01)

(58) Field of Classification Search
CPC .................................................. C08K 3/0016
USPC ............... 524/543–546, 442; 428/34.1, 34.4, 428/34.6, 34.7, 35.7, 36.4, 36.6–36.92; 138/118, 140, 141
See application file for complete search history.

(56) References Cited

U.S. PATENT DOCUMENTS

| 5,430,103 A      | 7/1995  | Ohata et al.           |
| 7,125,598 B2 *   | 10/2006 | Yamato et al. ........ 428/141 |
| 7,252,888 B2 *   | 8/2007  | Osen et al. ........... 428/500 |
| 2003/0180503 A1  | 9/2003  | Yamato et al.          |

FOREIGN PATENT DOCUMENTS

| CN | 1423673    A  | 6/2003  |
| EP | 1 674 524 A1  | 6/2006  |
| EP | 1 727 004 A2  | 11/2006 |
| JP | 52-15543   A  | 2/1977  |
| JP | 10-176090  A  | 6/1998  |

OTHER PUBLICATIONS

Database CA (Online), Chemical Abstracts Service, Jun. 30, 1998, XP002518521 retrieve from STN Database accession No. 129:68760 abstract, Columbus Ohio, US.

Eric W. Thomas et al., "Fluoroelastomer Compatibility with Biodiesel Fuels", Society of Automotive Engineers, ISSN:0099-5908, 2007, pp. 49-58.

* cited by examiner

*Primary Examiner* — Walter B Aughenbaugh
(74) *Attorney, Agent, or Firm* — Sughrue Mion, PLLC

(57) ABSTRACT

There is provided a polyol-crosslinkable fluorine-containing elastomer composition which is excellent in chemical resistance, solvent resistance (especially resistance to an acidic solvent) and fuel resistance (especially biofuel resistance) and is crosslinkable at the same crosslinking speed as in the case of using calcium hydroxide in a usual amount even without blending calcium hydroxide (or decreasing a blending amount of calcium hydroxide). The fluorine-containing elastomer composition comprises a polyol-crosslinkable fluorine-containing elastomer, a polyol crosslinking agent and a silicate of an alkali metal.

8 Claims, No Drawings

FLUORINE-CONTAINING ELASTOMER COMPOSITION AND MOLDED ARTICLE MADE OF SAME

CROSS-REFERENCE TO RELATED APPLICATIONS

This application is a Divisional of U.S. application Ser. No. 13/054,325 filed Jan. 14, 2011, now U.S. Pat. No. 8,481,140, which is a 371 of PCT International Application No. PCT/JP2008/072600 filed on Dec. 5, 2008 and which claims benefit of Japanese Patent Application No. 2008-186997 filed Jul. 18, 2008. The above-noted applications are incorporated herein by reference in their entirety.

TECHNICAL FIELD

The present invention relates to a fluorine-containing elastomer composition and a molded article made of the composition.

BACKGROUND ART

Fluorine-containing elastomers are widely used in the fields of automobile industry, semiconductor industry and chemical industry because they exhibit excellent chemical resistance, solvent resistance and heat resistance. For example, in the field of automobile industry, fluorine-containing elastomers are used as a hose, a sealing material and the like for an engine and peripheral equipment thereof, and automatic transmission (AT) equipment, fuel system and peripheral equipment thereof.

On the other hand, in compounding of components of fluorine-containing elastomer compositions of a polyol crosslinking system which is generally adopted, blending of calcium hydroxide to the compositions has been carried out to accelerate crosslinking (for example, refer to JP52-15543A and Takaomi Satokawa, "Fluorine-containing Resin Handbook", First Edition, Nikkan Kogyo Shuppan Production, Nov. 30, 1990, p. 567).

However, in a polyol-crosslinkable fluorine-containing elastomer composition, it is known that when an elastomer molded article comprising calcium hydroxide comes into contact with fuels (especially biofuels), chemicals and solvents (especially acidic solvents), decomposition and deterioration of such fuels and the like occur. Among these fuels and the like, biofuels (for example, biodiesel, etc.) produced from oils derived from living beings is easily oxidized and deteriorated in the presence of calcium hydroxide, and then a polyol-crosslinkable fluorine-containing elastomer composition after coming into contact with the deteriorated biofuel is also greatly subject to deterioration and swelling. There is no problem when an amount of calcium hydroxide is deceased or it is not blended. However, in the case of using no calcium hydroxide, a crosslinking speed is greatly decreased, which is not practicable. Therefore, the present situation is such that calcium hydroxide is blended.

DISCLOSURE OF INVENTION

It is an object of the present invention to provide a polyol-crosslinkable fluorine-containing elastomer composition which is excellent in fuel resistance (especially biofuel resistance), chemical resistance and solvent resistance (especially resistance to an acidic solvent) and is crosslinkable at the same level of a crosslinking speed as in the case of using a required amount of calcium hydroxide even without blending calcium hydroxide which increases the crosslinking speed but accelerates oxidation and deterioration of a fuel.

The present invention relates to a fluorine-containing elastomer composition comprising a polyol-crosslinkable fluorine-containing elastomer, a polyol crosslinking agent and a silicate of an alkali metal.

It is preferable that the silicate of an alkali metal is sodium silicate or a salt hydrate thereof.

Further, the present invention relates to a molded article prepared by polyol-crosslinking the above-mentioned fluorine-containing elastomer composition.

It is preferable that the molded article is a sealing material, especially a sealing material coming into contact with a biofuel.

It is preferable that the molded article is a fuel hose, especially a fuel hose coming into contact with a biofuel.

BEST MODE FOR CARRYING OUT THE INVENTION

The present invention relates to the fluorine-containing elastomer composition comprising a polyol-crosslinkable fluorine-containing elastomer, a polyol crosslinking agent and a silicate of an alkali metal.

Examples of the polyol-crosslinkable fluorine-containing elastomer which is used in the present invention are a fluorine-containing vinylidene fluoride (VdF) type elastomer, fluorine-containing tetrafluoroethylene (TFE)/propylene type elastomer, fluorine-containing TFE/propylene/VdF type elastomer, fluorine-containing ethylene/hexafluoropropylene (HFP) type elastomer, fluorine-containing ethylene/HFP/VdF type elastomer, fluorine-containing ethylene/HFP/TFE type elastomer, fluorine-containing fluorosilicone type elastomer, and fluorine-containing fluorophosphazene type elastomer. These can be used alone or can be used in an optional combination to such an extent not to impair the effects of the present invention.

Examples of preferred fluorine-containing VdF type elastomers are those represented by the formula (1).

$$-(M^1)-(M^2)-(N^1)- \quad (1)$$

(In the formula, the structural unit $M^1$ is a structural unit derived from VdF ($m^1$), the structural unit $M^2$ is a structural unit derived from a fluorine-containing ethylenic monomer ($m^2$) other than VdF ($m^1$), and the structural unit $N^1$ is a structural unit derived from a monomer ($n^1$) being copolymerizable with the monomer ($m^1$) and the monomer ($m^2$).)

In the fluorine-containing VdF type elastomers represented by the formula (1), assuming that the structural unit $M^1+M^2$ is 100% by mole, preferable is one comprising 20 to 85% by mole of the structural unit $M^1$ and 80 to 15% by mole of the structural unit $M^2$, and more preferable is one comprising 25 to 80% by mole of the structural unit $M^1$ and 75 to 20% by mole of the structural unit $M^2$. The structural unit $N^1$ is an optional structural unit, and it is preferable that the structural unit $N^1$ is contained in an amount of 0 to 10% by mole based on the total amount of the structural unit $M^1$ and the structural unit $M^2$.

Examples of the fluorine-containing ethylenic monomer ($m^2$) are one or two or more kinds of fluorine-containing monomers such as TFE, chlorotrifluoroethylene (CTFE), trifluoroethylene, HFP, trifluoropropylene, tetrafluoropropylene, pentafluoropropylene, trifluorobutene, tetrafluoroisobutene, fluoro(alkyl vinyl ether), perfluoro(alkyl vinyl ether) (PAVE) and vinyl fluoride. Among these, TFE, HFP, PAVE and a combination thereof are preferred. Examples of PAVE are perfluoro(methyl vinyl ether), perfluoro(propyl vinyl ether), and the like.

Any monomer can be used as the monomer ($n^1$) as far as it is copolymerizable with the monomer ($m^1$) and the monomer ($m^2$), and, for example, there are ethylene, propylene, alkyl vinyl ether and the like.

Specific examples of such fluorine-containing VdF type elastomers are preferably fluorine-containing VdF/HFP type elastomer, fluorine-containing VdF/HFP/TFE type elastomer, fluorine-containing VdF/CTFE type elastomer, fluorine-containing VdF/CTFE/TFE type elastomer and the like.

Examples of preferred fluorine-containing TFE/propylene type elastomers are those represented by the formula (2).

$$-(M^3)-(M^4)-(N^2)- \qquad (2)$$

(In the formula, the structural unit $M^3$ is a structural unit derived from tetrafluoroethylene ($m^3$), the structural unit $M^4$ is a structural unit derived from propylene ($m^4$), and the structural unit $N^2$ is a structural unit derived from a monomer ($n^2$) being copolymerizable with the monomer ($m^3$) and the monomer ($m^4$).)

In the fluorine-containing TFE/propylene type elastomers represented by the formula (2), assuming that the structural unit $M^3+M^4$ is 100% by mole, preferable is one comprising 40 to 70% by mole of the structural unit $M^3$ and 60 to 30% by mole of the structural unit $M^4$, and more preferable is one comprising 50 to 60% by mole of the structural unit $M^3$ and 50 to 40% by mole of the structural unit $M^4$. The structural unit $N^2$ is an optional structural unit, and it is preferable that the structural unit $N^2$ is contained in an amount of 0 to 40% by mole based on the total amount of the structural unit $M^3$ and the structural unit $M^4$.

Any monomer other than VdF can be used as the monomer ($n^2$) as far as it is copolymerizable with the monomer ($m^3$) and the monomer ($m^4$), and monomers giving cure site are preferred.

Examples of monomers giving cure site are iodine-containing monomers such as perfluoro(6,6-dihydro-6-iodo-3-oxa-1-hexene) and perfluoro(5-iodo-3-oxa-1-pentene) disclosed in JP5-63482B and JP7-316234A, bromine-containing monomers disclosed in JP4-505341A, cyano-containing monomers, carboxyl-containing monomers and alkoxycarbonyl-containing monomers disclosed in JP4-505345A and JP5-500070A, and the like.

Among the fluorine-containing elastomers, from the viewpoint of heat resistance, compression set, processability and cost, fluorine-containing elastomers comprising VdF unit is more preferable, and a VdF/HFP type elastomer and a VdF/HFP/TFE type elastomer are especially preferable.

The fluorine-containing elastomer is not limited to one kind, and two or more kinds may be used.

In addition, the fluorine-containing elastomer which is used in the present invention is preferably a fluorine-containing elastomer having a fluorine content of not less than 65% by mass, more preferably a fluorine-containing elastomer having a fluorine content of not less than 66% by mass, from the viewpoint of satisfactory chemical resistance, fuel resistance and fuel impermeability. An upper limit of the fluorine content is not limited particularly, and is preferably not more than 74% by mass.

In the present invention, the fluorine-containing elastomer is polyol-crosslinkable. Processability of the polyol-crosslinkable fluorine-containing elastomer is excellent as compared with processability of other crosslinkable fluorine-containing elastomer, and in addition, the molded article obtained by crosslinking in the presence of a polyol crosslinking agent is low in compression set and is excellent in heat resistance.

Herein, "crosslinking" means crosslinking of the same or different polymer chains of the fluorine-containing elastomer by using a crosslinking agent. By the crosslinking, the fluorine-containing elastomer comes to have improved strength and good elasticity.

In the present invention, compounds known as a crosslinking agent for fluorine-containing elastomers of polyol crosslinking system can be used as the polyol crosslinking agent to be blended to the fluorine-containing elastomer composition of the present invention, and, for example, polyhydroxy compounds are preferable since moldability is excellent and the fluorine-containing elastomer molded article obtained by crosslinking has small compression set, and particularly polyhydroxy aromatic compounds are suitably used from the viewpoint of excellent heat resistance.

The above-mentioned polyhydroxy aromatic compounds are not limited particularly, and for example, there are 2,2-bis(4-hydroxyphenyl)propane (hereinafter referred to as bisphenol A), 2,2-bis(4-hydroxyphenyl)perfluoropropane (hereinafter referred to as bisphenol AF), resorcin, 1,3-dihydroxybenzene, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 2,2-bis(4-hydroxyphenyl)butane (hereinafter referred to as bisphenol B), 4,4-bis(4-hydroxyphenyl)valeric acid, 2,2-bis(4-hydroxyphenyl)tetrafluorodichloropropane, 4,4'-dihydroxydiphenylsulfone, 4,4'-dihydroxydiphenylketone, tri(4-hydroxyphenyl)methane, 3,3',5,5'-tetrachlorobisphenol A, 3,3',5,5'-tetrabromobisphenol A and the like. Those polyhydroxy aromatic compounds may be alkali metal salts, alkali earth metal salts and the like. However in the case where a fluorine-containing elastomer is one obtained by coagulation using an acid and then separation and collection, it is preferable not to use the above-mentioned metal salts in order to prevent a metal from being contained in the composition.

Among these polyhydroxy aromatic compounds, bisphenol AF is especially preferable since moldability of the composition is satisfactory and the fluorine-containing elastomer molded article obtained by crosslinking is small in compression set and is excellent in heat resistance.

The amount of polyol crosslinking agent is preferably 0.2 to 10 parts by mass, more preferably 0.5 to 6 parts by mass, further preferably 1 to 3 parts by mass based on 100 parts by mass of the fluorine-containing elastomer. When the amount of crosslinking agent is less than 0.2 part by mass, there is a tendency that crosslinking density of the obtained molded article is low, and its compression set is increased. When the amount of crosslinking agent exceeds 10 parts by mass, there is a tendency that since crosslinking density of the obtained molded article becomes too high, it is easily broken at compression.

The fluorine-containing elastomer composition of the present invention comprises a silicate of an alkali metal. By blending the silicate of an alkali metal to the composition, polyol-crosslinking can be carried out in the same period of time as in the case of blending conventional calcium hydroxide even without blending calcium hydroxide. In addition, by blending the silicate of an alkali metal to the composition, since it is not necessary to blend calcium hydroxide for accelerating a crosslinking speed, deterioration and swelling of the obtained molded article which occur due to contact with a chemical, a solvent (especially an acidic solvent) or a fuel (especially a biofuel) can be decreased and in addition, improvement in compression set can be expected.

Examples of a silicate of an alkali metal are sodium silicate, potassium silicate, lithium silicate, and salt hydrates thereof.

In the case where the silicate of an alkali metal is sodium silicate or its salt hydrate, the composition of sodium silicate or its salt hydrate is represented by a mass ratio (%) of Na2O, SiO2 and H2O, and is preferably 0.5 to 95% by mass of Na2O, 5 to 99% by mass of SiO2 and 0 to 94.5% by mass of H2O. In addition, from the viewpoint of an excellent effect of increasing a crosslinking speed, 1 to 85% by mass of Na2O, 2.0 to 95% by mass of SiO2 and 0 to 85% by mass of $H_2O$ is more preferable. Further, from the viewpoint of excellent processability, 2 to 70% by mass of Na2O, 7.0 to 70% by mass of SiO2 and 0 to 75% by mass of $H_2O$ is further preferable.

Examples of commercially available sodium silicate or its salt hydrate are, for instance, Sodium Silicate No. 1 to No. 5 (available from Fuji Kagaku Corp.), sodium metasilicate, 5hydrate and sodium metasilicate, 9hydrate (available from Fuji Kagaku Corp.), sodium orthosilicate (65%, 80%) (available from Osaka Keisou Co., Ltd.), Sodium Silicate Powder No. 1 to No. 3 (available from Nippon Chemical Industrial Co., Ltd.) and anhydrous sodium silicate (available from Osaka Keisou Co., Ltd.).

In the case where the silicate of an alkali metal is a salt hydrate of potassium silicate, the composition of a salt hydrate of potassium silicate is represented by a mass ratio (%) of K2O, SiO2 and H2O, and is preferably 5 to 30% by mass of K2O, 15 to 35% by mass of SiO2 and 35 to 80% by mass of H2O.

Examples of commercially available salt hydrate of potassium silicate are, for instance, potassium silicate No. 1 and potassium silicate No. 2 (available from Fuji Kagaku Corp.).

In the case where the silicate of an alkali metal is a salt hydrate of lithium silicate, the composition of a salt hydrate of lithium silicate is represented by a mass ratio (%) of Li2O, SiO2 and H2O, and is preferably 0.5 to 10% by mass of Li2O, 15 to 25% by mass of SiO2 and 65 to 84.5% by mass of H2O.

Examples of commercially available salt hydrate of lithium silicate are, for instance, Lithium silicate 45 (available from Nippon Chemical Industrial Co., Ltd.).

Among these silicates of an alkali metal, sodium silicate or its salt hydrate is preferable since stable crosslinking speed can be obtained and fuel resistance is satisfactory.

The amount of silicate of an alkali metal is preferably 0.1 to 10 parts by mass, more preferably 0.2 to 7 parts by mass based on 100 parts by mass of the fluorine-containing elastomer.

In the present invention, the use of calcium hydroxide is not necessarily excluded, but the use of calcium hydroxide should be inhibited to an extent not to affect the advantages and effects exhibited by the use of the silicate of an alkali metal. The amount of calcium hydroxide should be less than the amount of silicate of an alkali metal contained in the fluorine-containing elastomer composition, and concretely should be not more than 3 parts by mass, further not more than 1 part by mass based on 100 parts by mass of the fluorine-containing elastomer. It is especially preferable that calcium hydroxide is not blended substantially.

A crosslinking accelerator, an acid acceptor, a crosslinking aid and a co-crosslinking agent may be blended to the composition as additives relating to the crosslinking other than the above-mentioned polyol crosslinking agent and silicate of an alkali metal.

When a crosslinking accelerator is used, formation of intermolecular double bond by dehydrofluorination reaction of a trunk chain of the fluorine-containing elastomer is accelerated, thereby enabling crosslinking reaction to be accelerated.

The crosslinking accelerator is not limited particularly, and onium salts can be used.

Onium salts are not limited particularly, and preferred examples thereof are, for instance, quaternary ammonium salts, quaternary phosphonium salts, oxonium salts, sulfonium salts, cyclic amines, mono-functional amine compounds and the like. Among these, quaternary ammonium salts and quaternary phosphonium salts are preferable.

The quaternary ammonium salt is not limited particularly, and examples thereof are, for instance, salts of 1,8-diazabicyclo[5,4,0]-7-undecenium derivative such as
8-methyl-1,8-diazabicyclo[5,4,0]-7-undeceniumchloride,
8-methyl-1,8-diazabicyclo[5,4,0]-7-undeceniumiodide,
8-methyl-1,8-diazabicyclo[5,4,0]-7-undeceniumhydroxide,
8-methyl-1,8-diazabicyclo[5,4,0]-7-undeceniummethylsulfate,
8-ethyl-1,8-diazabicyclo[5,4,0]-7-undeceniumbromide,
8-propyl-1,8-diazabicyclo[5,4,0]-7-undeceniumbromide,
8-dodecyl-1,8-diazabicyclo[5,4,0]-7-undeceniumchloride,
8-dodecyl-1,8-diazabicyclo[5,4,0]-7-undeceniumhydroxide,
8-eicosyl-1,8-diazabicyclo[5,4,0]-7-undeceniumchloride,
8-tetracosyl-1,8-diazabicyclo[5,4,0]-7-undeceniumchloride,
8-benzyl-1,8-diazabicyclo[5,4,0]-7-undeceniumchloride
(hereinafter referred to as DBU-B),
8-benzyl-1,8-diazabicyclo[5,4,0]-7-undeceniumhydroxide,
8-phenetyl-1,8-diazabicyclo[5,4,0]-7-undeceniumchloride,
8-(3-phenylpropyl)-1,8-diazabicyclo[5,4,0]-7-undeceniumchloride and the like. Among these, 8-methyl-1,8-diazabicyclo[5,4,0]-7-undecenium salt and DBU-B are preferable from the viewpoint of satisfactory crosslinkability and physical properties of a crosslinked product.

The quaternary phosphonium salt is not limited particularly, and examples thereof are, for instance, tetrabutylphosphonium chloride, benzyltriphenylphosphonium chloride (hereinafter referred to as BTPPC), benzyltrimethylphosphonium chloride, benzyltributylphosphonium chloride, tributylallylphosphonium chloride, tributyl-2-methoxypropylphosphonium chloride, benzylphenyl(dimethylamino) phosphonium chloride and the like. Among these, BTPPC is preferable from the viewpoint of satisfactory crosslinkability and physical properties of a crosslinked product.

In addition, solid solutions of quaternary phosphonium salts and bisphenol AF, and compounds disclosed in JP11-147891A can be used.

Also, two or more kinds of onium salts may be used.

The amount of crosslinking accelerator is preferably 0.1 to 5.0 parts by mass, more preferably 0.2 to 2 parts by mass, further preferably 0.3 to 1.5 parts by mass based on 100 parts by mass of the fluorine-containing elastomer since a crosslinking speed, physical properties in normal state of a molded article and compression set are easily adjusted.

An acid acceptor is one used for removing an acidic substance to be generated at the polyol crosslinking, and examples thereof are magnesium oxide, calcium oxide, litharge (lead oxide), zinc oxide, dibasic phosphite, hydrotalcite and the like.

When magnesium oxide is used as an acid acceptor, its amount is preferably not less than 0.1 part by mass, more preferably not less than 0.5 part by mass, further preferably not less than 1 part by mass based on 100 parts by mass of the fluorine-containing elastomer since there is an excellent effect of accepting hydrogen fluoride to be generated in the crosslinking reaction. In addition, from the viewpoint of satisfactory chemical resistance, the amount is preferably not more than 10 parts by mass, more preferably not more than 5 parts by mass based on 100 parts by mass of the fluorine-containing elastomer.

In addition, it is possible to blend, to the fluorine-containing elastomer composition of the present invention, usual additives to be blended to fluorine-containing elastomer compositions as case demands, for example, a filler, a processing aid, a plasticizer, a colorant, a stabilizer, an adhesion aid, a mold releasing agent, an electric conductivity imparting agent, a thermal conductivity imparting agent, an agent for imparting surface non-adhesiveness, a flexibility imparting agent, a heat resistance improver, a flame retardant and the like.

The fluorine-containing elastomer composition of the present invention can be obtained by kneading the polyol-crosslinkable fluorine-containing elastomer, polyol crosslinking agent, silicate of an alkali metal, and other compounding agents to be blended as case demands such as a crosslinking accelerator and an acid acceptor by using a rubber kneading equipment generally used. A roll, kneader, Banbury mixer, internal mixer, twin screw extruder or the like can be used as the rubber kneading equipment.

Many of polyol crosslinking agents and crosslinking accelerators have relatively high melting point. Therefore, when using a crosslinking agent together with a crosslinking accelerator, in order to uniformly disperse them in the fluorine-containing elastomer, there is preferably used a method of kneading a crosslinking agent and a crosslinking accelerator while melting them at high temperature of 100° to 150° C. by using a closed kneading equipment such as a kneader and then kneading together with the fluorine-containing elastomer and if necessary, other compounding agents such as a filler at a temperature lower than the temperature mentioned above. In addition, there is a method of, after mixing a polyol crosslinking agent and a crosslinking accelerator, melting them and forming the mixture into a solid solution having a lowered melting point and then uniformly dispersing by using the obtained solid solution.

Dispersibility can be further increased by kneading the fluorine-containing elastomer composition, allowing to stand at room temperature for 12 hours or more and then carrying out kneading again.

The present invention also relates to the molded article obtained by polyol-crosslinking the above-mentioned fluorine-containing elastomer composition.

The molded article of the present invention is prepared by molding and polyol-crosslinking the above-mentioned fluorine-containing elastomer composition. The polyol-crosslinking can be carried out under any conditions such as under normal pressure, under pressure, under reduced pressure or in the air.

For crosslinking, usual methods such as press crosslinking and steam crosslinking can be employed. Crosslinking conditions may be optionally determined depending on kind and amount of fluorine-containing polymer, polyol crosslinking agent, and silicate of an alkali metal, and usually crosslinking is carried out at 100° to 200° C. for 5 to 60 minutes. Further, when the crosslinking needs be completed, secondary crosslinking may be conducted.

In the present invention, by blending the silicate of an alkali metal, polyol-crosslinking can be carried out in the same period of time as in the case of using calcium hydroxide even without blending calcium hydroxide.

Since the molded article of the present invention comprises the silicate of an alkali metal, it is not necessary to blend calcium hydroxide for accelerating a crosslinking speed. Therefore, deterioration and swelling of the obtained molded article which occur due to contact with a chemical, a solvent (especially an acidic solvent) or a fuel (especially a biofuel) can be decreased, and in addition, improvement in compression set can be expected. In addition, since the molded article has heat resistance, it is useful as a sealing material and a fuel hose, especially as a sealing material and a fuel hose for an engine and peripheral equipment thereof, AT equipment, a fuel system and peripheral equipment thereof of automobiles.

Application of the molded article of the present invention as the sealing material is not limited particularly, and examples are, for instance, sealing materials such as gaskets and non-contact type and contact type packings (self-seal packing, piston ring, split ring packing, mechanical seal, oil seal, etc.) which are required to have heat resistance, oil resistance, fuel oil resistance, resistance to an anti-freezing fluid for cooling an engine and steam resistance and are used for automobile engine such as engine body, main engine-driving system, engine-driving valve system, lubricating and cooling system, fuel system, and suction/exhaust system; transmission of drive system; steering system of chassis; brake system; standard electrical parts for instrumentation, electrical parts for control and equipped electrical parts.

Sealing materials used on an engine body of automobiles are not limited particularly, and examples thereof are, for instance, gaskets such as a cylinder head gasket, cylinder head cover gasket, oil pan packing and general gaskets, and sealing materials such as an O-ring, packing and timing belt cover gasket.

Sealing materials used on a main drive system of an automobile engine are not limited particularly, and examples thereof are, for instance, shaft seals such as crank shaft seal and cam shaft seal.

Sealing materials used on valves of an automobile engine are not limited particularly, and examples thereof are, for instance, a valve stem oil seal of an engine valve.

Sealing materials used on a lubricating and cooling system of an automobile engine are not limited particularly, and examples thereof are, for instance, a seal gasket for an engine oil cooler and the like.

Sealing materials used on a fuel system of an automobile engine are not limited particularly, and examples thereof are, for instance, an oil seal of a fuel pump, a filler seal and tank packing of a fuel tank, a connector O-ring of a fuel tube, an injector cushion ring, an injector seal ring and an injector O-ring of a fuel injector, a flange gasket of a carburetor and the like.

Sealing materials used on a suction/exhaust system of an automobile engine are not limited particularly, and examples thereof are, for instance, a suction manifold packing and exhaust manifold packing of a manifold, a throttle body packing, a turbine shaft seal of a turbo charger and the like.

Sealing materials used on a transmission system of an automobile engine are not limited particularly, and examples thereof are, for instance, a bearing seal, oil seal, O-ring and packing for transmission and an O-ring and packing for automatic transmission (AT).

Sealing materials used on a brake system of an automobile engine are not limited particularly, and examples thereof are, for instance, an oil seal, O-ring, packing, piston cup (rubber cup) of a master cylinder, caliper seal, boots and the like.

Sealing materials used on electrical parts of an automobile engine are not limited particularly, and examples thereof are, for instance, an O-ring and packing of an air conditioner.

Applications of the sealing material other than automobile application are not limited particularly, and examples thereof are, for instance, packing, O-ring and other sealing materials requiring oil resistance, chemical resistance, heat resistance, steam resistance and weather resistance for transport means such as ships and airplanes; similar packing, O-ring and other sealing materials for chemical plants; similar packing, O-ring and other sealing materials for food plant equipment and food processing equipment (including those for domestic use); similar packing, O-ring and other sealing materials for equipment of atomic power plant; and similar packing, O-ring and other sealing materials for general industrial parts.

The molded article of the present invention is suitably used as hoses (including tubes) for the above-mentioned various applications of the sealing material, equipment and parts, and is suitable especially as hoses for industrial use and fuel hoses.

The molded article of the present invention is also useful for molded articles such as sealing materials and hoses coming into contact with fuels derived from plants such as maize and soy bean, i.e., so-called biofuels. Among biofuels, especially in the case of a biodiesel fuel, when it is used under harsh conditions where fossil fuels are used, there is a case where various components and impurities derived from living beings are subject to decomposition and chemical change such as oxidation and deterioration, resulting in deterioration and swelling of various metal, resin and rubber members coming into contact with such fuels. The molded article of the present invention is hardly subject to deterioration and swelling even if it contacts a biofuel in which various components and impurities derived from living beings have suffered from decomposition and chemical change such as oxidation and deterioration, and therefore, can be used as various members such as sealing materials and fuel hoses for biofuels.

"Biofuel" means fuels prepared from living beings, and example thereof are liquid fuels, for instance, bio-alcohols such as biomethanol and bioethanol; biogasoline prepared by mixing bioalcohol and gasoline; ETBE-mixed gasoline comprising gasoline and ethyl tertiary butyl ether (ETBE) which is a reaction product of bioethanol and isobutene; and biodiesel fuel. Also, biofuels include not only these fuels used for power source but also fuels for heating. In addition, the use of fossil fuel together is not excluded.

EXAMPLE

The present invention is then explained by means of Examples and Comparative Examples, but is not limited to those Examples.

Each chemical used in Examples and Comparative Examples is as follows.

Fluorine-containing elastomer A: Polyol-crosslinkable fluorine-containing elastomer comprising two monomers (VdF/HFP=78/22 (mole %), fluorine content: 66% by mass, Mooney viscosity ML1+10(100° C.): 45)

Fluorine-containing elastomer B: Polyol-crosslinkable fluorine-containing elastomer comprising three monomers (VdF/TFE/HFP=58/22/20 (mole %), fluorine content: 69% by mass, Mooney viscosity ML1+10(100° C.): 42)

Polyol crosslinking agent: 2,2-bis(4-hydroxyphenyl)perfluoropropane (Bisphenol AF)

Crosslinking accelerator:
8-benzyl-1,8-diazabicyclo[5,4,0]-7-undeceniumchloride (DBU-B)

Crosslinking accelerator: Crosslinking accelerator (VC50) available from Du Pont Performance Elastomers, a blend of bisphenol AF and benzyltriphenylphosphonium salt of bisphenol AF Carbon black 1: Carbon black (MT-C) available from Cancarb Co., Ltd.

Carbon black 2: Carbon black (SEAST S) available from Tokai Carbon Co., Ltd.

Magnesium oxide: Magnesium oxide (MA150) available from Kyowa Chemical Industries, Co., Ltd.

Calcium hydroxide: Calcium hydroxide (CALDIC #2000) available from Ohmi Chemical Industry Co., Ltd.

Salt hydrate of sodium silicate No. 1: Sodium silicate No. 1 available from Fuji Kagaku Corp., Na2O=15% by mass, SiO2=32% by mass, $H_2O$=53% by mass Salt hydrate of sodium silicate No. 2: Sodium silicate No. 2 available from Fuji Kagaku Corp., Na2O=12% by mass, SiO2=28% by mass, $H_2O$=60% by mass Salt hydrate of sodium silicate No. 3: Sodium silicate No. 3 available from AGC Si-Tech. Co., Ltd., Na2O=10% by mass, SiO2=29% by mass, $H_2O$=61% by mass Salt hydrate of sodium silicate No. 5: Sodium silicate No. 5 available from Fuji Kagaku Corp., Na2O=7% by mass, SiO2=26% by mass, $H_2O$=67% by mass Sodium metasilicate, 5hydrate: Sodium metasilicate, 5hydrate available from Fuji Kagaku Corp., Na2O=30% by mass, SiO2=29% by mass, $H_2O$=41% by mass Salt hydrate of 65% sodium orthosilicate: 65% sodium orthosilicate available from Osaka Keisou Co., Ltd., Na2O=43% by mass, SiO2=22% by mass, $H_2O$=35% by mass Salt hydrate of potassium silicate No. 1: Potassium silicate No. 1 available from Fuji Kagaku Corp., K2O=22% by mass, SiO2=28% by mass, $H_2O$=50% by mass Salt hydrate of potassium silicate No. 2: Potassium silicate No. 2 available from Fuji Kagaku Corp., K2O=9% by mass, SiO2=20.5% by mass, $H_2O$=70.5% by mass Salt hydrate of lithium silicate: Lithium silicate 45 available from Nippon Chemical Industrial Co., Ltd., Li2O=2.5% by mass, SiO2=21% by mass, $H_2O$=76.5% by mass Magnesium silicate: AD600 available from Tomita Pharmaceutical Co., Ltd.

Calcium silicate: AD850H200M available from Tomita Pharmaceutical Co., Ltd.

Aluminum silicate: AD700 available from Tomita Pharmaceutical Co., Ltd.

Example 1

To 100 parts by mass of fluorine-containing elastomer A were mixed 1.5 parts by mass of bisphenol AF as a crosslinking agent and 0.3 part by mass of DBU-B as a crosslinking accelerator, and the mixture was kneaded with an open roll. Thereto were added Carbon black 1, magnesium oxide and salt hydrate of sodium silicate No. 1 in the proportions shown in Table 1, followed by kneading with an open roll to prepare a crosslinkable fluorine-containing elastomer composition. Then, the composition was formed into an about 2 mm thick sheet to prepare an un-crosslinked rubber sheet. Crosslinking characteristics of the obtained un-crosslinked rubber sheet were measured by the following methods. Proportions (parts by mass) of the components of the fluorine-containing elastomer composition are shown in Table 1, and the results of evaluation of the crosslinking characteristics are shown in Table 2.

<Crosslinking Characteristics>

A crosslinking curve of an un-crosslinked rubber sheet is examined at a crosslinking temperature shown in Table 2 according to JIS K6300-2 by using a rubber processability analyzer RPA2000 (available from Alpha Technologies, Japan LLC) to determine induction time (T10), 90% crosslinking time (T90), maximum torque (ML) and minimum torque (MH).

Then, the obtained un-crosslinked rubber sheet is subjected to press crosslinking at a temperature and time shown in Table 2 and further heating in an oven at a temperature and time shown in Table 2 (secondary crosslinking) to obtain a 2 mm thick crosslinked rubber sheet as a crosslinked molded article.

Heating characteristics and resistance to biodiesel fuel of this crosslinked rubber sheet are measured by the following methods. The results of evaluation are shown in Table 2.

<Heating Characteristics>

Compression set (CS) is measured at 200° C. for 72 hours by 25% compression according to JIS B2401.

<Resistance to Biodiesel Fuel>

A volume of a crosslinked rubber sheet before dipping is measured. Then, the crosslinked rubber sheet is dipped in a deteriorated biodiesel fuel (SME (soybean methyl ester) fuel (NEXSOL BD-0100 BIODIESEL available from PETER CREMER): 2% by volume of water is contained) at 125° C. for 504 hours. A volume of the crosslinked rubber sheet after the dipping is measured, and a rate of change in volume (%) is determined.

Examples 2 to 9

Un-crosslinked rubber sheets were prepared in the same manner as in Example 1 except that salt hydrate of sodium silicate No. 2 (Example 2), salt hydrate of sodium silicate No. 3 (Example 3), salt hydrate of sodium silicate No. 5 (Example 4), sodium metasilicate, 5hydrate (Example 5), salt hydrate of 65% sodium orthosilicate (Example 6), salt hydrate of potassium silicate No. 1 (Example 7), salt hydrate of potassium silicate No. 2 (Example 8) and salt hydrate of lithium silicate (Example 9) were used respectively in amounts shown in Table 1 instead of salt hydrate of sodium silicate No. 1, and crosslinking characteristics of the obtained un-crosslinked rubber sheets were measured. The results of evaluation are shown in Table 2.

Then, crosslinked rubber sheets were prepared by crosslinking the un-crosslinked rubber sheets under the same crosslinking conditions as in Example 1, and physical properties were measured. Proportions (parts by mass) of the components of the fluorine-containing elastomer compositions are shown in Table 1, and the results of evaluation are shown in Table 2.

Example 10

To 100 parts by mass of fluorine-containing elastomer B were mixed 2 parts by mass of a crosslinking agent (bisphenol AF) and 0.6 part by mass of a crosslinking accelerator (DBU-B), and the mixture was kneaded with an open roll. Thereto were added Carbon black 2, salt hydrate of sodium silicate No. 1 and magnesium oxide in amounts shown in Table 1, followed by kneading. An un-crosslinked rubber sheet was prepared in the same manner as in Example 1, and crosslinking characteristics of the obtained un-crosslinked rubber sheet were examined. The results of evaluation are shown in Table 2.

Then, the un-crosslinked rubber sheet was subjected to crosslinking under the crosslinking conditions shown in Table 2 (no secondary crosslinking was carried out) to prepare a crosslinked molded article (crosslinked rubber sheet), and physical properties were measured. With respect to heating characteristics, compression set (CS) was measured at 100° C. for 72 hours by 25% compression according to JIS B2401. Proportions (parts by mass) of the components of the fluorine-containing elastomer composition are shown in Table 1, and the results of evaluation are shown in Table 2.

Example 11

To 100 parts by mass of fluorine-containing elastomer B were mixed 2 parts by mass of a crosslinking agent (bisphenol AF) and 0.6 part by mass of a crosslinking accelerator (DBU-B), and the mixture was kneaded with an open roll. Thereto were added Carbon black 2, salt hydrate of potassium silicate No. 1 and magnesium oxide in amounts shown in Table 1, followed by kneading. An un-crosslinked rubber sheet was prepared in the same manner as in Example 1, and crosslinking characteristics of the obtained un-crosslinked rubber sheet were examined. The results of evaluation are shown in Table 2.

Then, the un-crosslinked rubber sheet was subjected to crosslinking under the crosslinking conditions shown in Table 2 (no secondary crosslinking was carried out) to prepare a crosslinked molded article (crosslinked rubber sheet), and physical properties were measured. With respect to heating characteristics, compression set (CS) was measured at 100° C. for 72 hours by 25% compression according to JIS B2401. Proportions (parts by mass) of the components of the fluorine-containing elastomer composition are shown in Table 1, and the results of evaluation are shown in Table 2.

Example 12

To 100 parts by mass of fluorine-containing elastomer A were mixed 1 part by mass of a crosslinking agent (bisphenol AF) and 1.5 parts by mass of a crosslinking accelerator (VC50), and the mixture was kneaded with an open roll. Thereto were added Carbon black 1, sodium metasilicate, 5hydrate and magnesium oxide in amounts shown in Table 1, followed by kneading. An un-crosslinked rubber sheet was prepared in the same manner as in Example 1, and crosslinking characteristics of the obtained un-crosslinked rubber sheet were measured. The results of evaluation are shown in Table 2.

Then, the un-crosslinked rubber sheet was subjected to crosslinking under the same crosslinking conditions as in Example 1 to prepare a crosslinked molded article (crosslinked rubber sheet), and physical properties were measured. Proportions (parts by mass) of the components of the fluorine-containing elastomer composition are shown in Table 1, and the results of evaluation are shown in Table 2.

Examples 13 and 14

Un-crosslinked rubber sheets were prepared in the same manner as in Example 12 except that salt hydrate of 65% sodium orthosilicate (Example 13) and salt hydrate of lithium silicate (Example 14) were used instead of sodium metasilicate, 5hydrate, and crosslinking characteristics of the obtained un-crosslinked rubber sheets were examined. The results of evaluation are shown in Table 2.

Then, the un-crosslinked rubber sheets were subjected to crosslinking under the same crosslinking conditions as in Example 1 to prepare crosslinked molded articles (crosslinked rubber sheets), and physical properties were measured. Proportions (parts by mass) of the components of the fluorine-containing elastomer composition are shown in Table 1, and the results of evaluation are shown in Table 2.

TABLE 1

| | Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Fluorine-containing elastomer | | | | | | | | | | | | | | |
| A | 100 | 100 | 100 | 100 | 100 | 100 | 100 | 100 | 100 | — | — | 100 | 100 | 100 |
| B | — | — | — | — | — | — | — | — | — | 100 | 100 | — | — | — |
| Crosslinking agent | | | | | | | | | | | | | | |
| Bisphenol AF | 1.5 | 1.5 | 1.5 | 1.5 | 1.5 | 1.5 | 1.5 | 1.5 | 1.5 | 2 | 2 | 1 | 1 | 1 |
| Crosslinking accelerator | | | | | | | | | | | | | | |
| DBU-B | 0.3 | 0.3 | 0.3 | 0.3 | 0.3 | 0.3 | 0.3 | 0.3 | 0.3 | 0.6 | 0.6 | — | — | — |
| VC50 | — | — | — | — | — | — | — | — | — | — | — | 1.5 | 1.5 | 1.5 |
| Acid acceptor | | | | | | | | | | | | | | |
| Magnesium oxide | 3 | 3 | 3 | 3 | 3 | 3 | 3 | 3 | 3 | 3 | 3 | 3 | 3 | 3 |
| Filler | | | | | | | | | | | | | | |
| Carbon black 1 | 20 | 20 | 20 | 20 | 20 | 20 | 20 | 20 | 20 | — | — | 20 | 20 | 20 |
| Carbon black 2 | — | — | — | — | — | — | — | — | — | 13 | 13 | — | — | — |
| Silicate of alkali metal | | | | | | | | | | | | | | |
| Salt hydrate of sodium silicate No. 1 | 3 | — | — | — | — | — | — | — | — | — | 3 | — | — | — |
| Salt hydrate of sodium silicate No. 2 | — | 3 | — | — | — | — | — | — | — | — | — | — | — | — |
| Salt hydrate of sodium silicate No. 3 | — | — | 3 | — | — | — | — | — | — | — | — | — | — | — |
| Salt hydrate of sodium silicate No. 5 | — | — | — | 3 | — | — | — | — | — | — | — | — | — | — |
| Sodium metasilicate, 5hydrate | — | — | — | — | 0.5 | — | — | — | — | — | — | 0.5 | — | — |
| Salt hydrate of 65% sodium orthosilicate | — | — | — | — | — | 0.5 | — | — | — | — | — | — | 0.5 | — |
| Salt hydrate of potassium silicate No. 1 | — | — | — | — | — | — | 3 | — | — | — | — | 2 | — | — |
| Salt hydrate of potassium silicate No. 2 | — | — | — | — | — | — | — | 3 | — | — | — | — | — | — |
| Salt hydrate of lithium silicate | — | — | — | — | — | — | — | — | 3 | — | — | — | — | 3 |

TABLE 2

| | Example | | | | | | |
|---|---|---|---|---|---|---|---|
| | 1 | 2 | 3 | 4 | 5 | 6 | 7 |
| Crosslinking characteristics | | | | | | | |
| Temperature (° C.) | 170 | 170 | 170 | 170 | 170 | 170 | 170 |
| ML (kgf) | 0.1 | 0.1 | 0.1 | 0.1 | 0.2 | 0.2 | 0.3 |
| MH (kgf) | 2.9 | 2.6 | 2 | 2.2 | 3 | 2.8 | 3.3 |
| T10 (min) | 1.6 | 1.7 | 2.8 | 2.4 | 2.5 | 2.1 | 0.8 |
| T90 (min) | 2.3 | 2.5 | 4.4 | 3.9 | 4.9 | 3.1 | 1.7 |
| Crosslinking conditions | | | | | | | |
| Press Crosslinking | 170° C. × 10 min | 170° C. × 10 min | 170° C. × 10 min | 170° C. × 10 min | 170° C. × 10 min | 170° C. × 10 min | 170° C. × 10 min |
| Secondary | 230° C. × | 230° C. × | 230° C. × | 230° C. × | 230° C. × | 230° C. × | 230° C. × |

TABLE 2-continued

|  | | | | | | | |
|---|---|---|---|---|---|---|---|
| Crosslinking Heating characteristics | 24 hr | 24 hr | 24 hr | 24 hr | 24 hr | 24 hr | 24 hr |
| CS (200° C. × 72 hr) | 19 | 18 | 20 | 19 | 18 | 17 | 20 |
| CS (100° C. × 72 hr) | — | — | — | — | — | — | — |
| Resistance to biodiesel fuel | 7 | 6 | 5 | 6 | 7 | 8 | 6 |

|  | Example | | | | | | |
|---|---|---|---|---|---|---|---|
|  | 8 | 9 | 10 | 11 | 12 | 13 | 14 |
| Crosslinking characteristics | | | | | | | |
| Temperature (° C.) | 170 | 170 | 160 | 160 | 170 | 170 | 170 |
| ML (kgf) | 0.2 | 0.1 | 0.3 | 0.3 | 0.2 | 0.2 | 0.1 |
| MH (kgf) | 2.9 | 1.8 | 1.9 | 2 | 3.3 | 3.3 | 2.7 |
| T10 (min) | 1.9 | 2.2 | 4.9 | 4.2 | 1.4 | 1.3 | 1.2 |
| T90 (min) | 3.2 | 4.5 | 12.5 | 13.5 | 2.5 | 2.4 | 1.4 |
| Crosslinking conditions | | | | | | | |
| Press Crosslinking | 170° C. × 10 min | 170° C. × 10 min | 160° C. × 45 min | 160° C. × 45 min | 170° C. × 10 min | 170° C. × 10 min | 170° C. × 10 min |
| Secondary Crosslinking Heating characteristics | 230° C. × 24 hr | 230° C. × 24 hr | — | — | 230° C. × 24 hr | 230° C. × 24 hr | 230° C. × 24 hr |
| CS (200° C. × 72 hr) | 20 | 19 | — | — | 13 | 12 | 16 |
| CS (100° C. × 72 hr) | — | — | 20 | 16 | — | — | — |
| Resistance to biodiesel fuel | 10 | 8 | 4 | 7 | 5 | 5 | 5 |

Comparative Examples 1 and 2

Un-crosslinked rubber sheets were prepared in the same manner as in Example 1 except that calcium hydroxide was used in an amount shown in Table 3 instead of salt hydrate of sodium silicate No. 1, and crosslinking characteristics of the obtained un-crosslinked rubber sheets were examined. The results of evaluation are shown in Table 4.

Then, the un-crosslinked rubber sheets were subjected to crosslinking under the same crosslinking conditions as in Example 1 to prepare crosslinked molded articles (crosslinked rubber sheets), and physical properties were measured. Proportions (parts by mass) of the components of the fluorine-containing elastomer compositions are shown in Table 3, and the results of evaluation are shown in Table 4.

Comparative Example 3

An un-crosslinked rubber sheet was prepared in the same manner as in Example 1 except that magnesium silicate was used instead of salt hydrate of sodium silicate No. 1. The obtained un-crosslinked rubber sheet was subjected to press crosslinking, but was not crosslinked and remained un-crosslinked.

Comparative Example 4

An un-crosslinked rubber sheet was prepared in the same manner as in Example 1 except that calcium silicate was used in an amount shown in Table 3 instead of salt hydrate of sodium silicate No. 1, and crosslinking characteristics of the obtained un-crosslinked rubber sheet were examined. The results of evaluation are shown in Table 4.

Then, the un-crosslinked rubber sheet was subjected to crosslinking under the same crosslinking conditions as in Example 1 to prepare crosslinked molded article (crosslinked rubber sheet), and physical properties were measured. Proportions (parts by mass) of the components of the fluorine-containing elastomer composition are shown in Table 3, and the results of evaluation are shown in Table 4.

Comparative Examples 5 to 7

Un-crosslinked rubber sheets were prepared in the same manner as in Example 1 except that aluminum silicate (Comparative Example 5), magnesium silicate and pure water (Comparative Example 6) and calcium silicate and pure water (Comparative Example 7) were used instead of salt hydrate of sodium silicate No. 1. The obtained un-crosslinked rubber sheets were subjected to press crosslinking, but were not crosslinked and remained un-crosslinked.

Comparative Examples 8 and 9

To 100 parts by mass of fluorine-containing elastomer B were mixed 2 parts by mass of a crosslinking agent (bisphenol AF) and 0.6 part by mass of a crosslinking accelerator (DBU-B), and the mixture was kneaded with an open roll. Thereto were added Carbon black 2, calcium hydroxide and magnesium oxide in amounts shown in Table 3, followed by kneading. Un-crosslinked rubber sheets were prepared in the same manner as in Comparative Example 1, and crosslinking characteristics of the obtained un-crosslinked rubber sheets were examined. The results of evaluation are shown in Table 4.

Then, the un-crosslinked rubber sheets were subjected to crosslinking under the crosslinking conditions shown in Table 4 (no secondary crosslinking was carried out) to prepare crosslinked molded articles (crosslinked rubber sheets), and physical properties were measured. With respect to heating characteristics, compression set (CS) was measured at 100° C. for 72 hours by 25% compression according to JIS B2401. Proportions (parts by mass) of the components of the fluorine-containing elastomer compositions are shown in Table 3, and the results of evaluation are shown in Table 4.

Comparative Examples 10 and 11

To 100 parts by mass of fluorine-containing elastomer A were mixed 1 part by mass of a crosslinking agent (bisphenol AF) and 1.5 parts by mass of a crosslinking accelerator (VC50), and the mixture was kneaded with an open roll. Thereto were added Carbon black 1, calcium hydroxide and magnesium oxide in amounts shown in Table 3, followed by kneading. Un-crosslinked rubber sheets were prepared in the same manner as in Comparative Example 1, and crosslinking characteristics of the obtained un-crosslinked rubber sheets were examined. The results of evaluation are shown in Table 4.

Then, the un-crosslinked rubber sheets were subjected to crosslinking under the same crosslinking conditions as in Example 1 to prepare crosslinked molded articles (crosslinked rubber sheets), and physical properties were measured. Proportions (parts by mass) of the components of the fluorine-containing elastomer compositions are shown in Table 3, and the results of evaluation are shown in Table 4.

TABLE 3

| | Comparative Example | | | | | | | | | | |
|---|---|---|---|---|---|---|---|---|---|---|---|
| | 1 | 2 | 3 | 4 | 5 | 6 | 7 | 8 | 9 | 10 | 11 |
| Fluorine-containing elastomer | | | | | | | | | | | |
| A | 100 | 100 | 100 | 100 | 100 | 100 | 100 | — | — | 100 | 100 |
| B | — | — | — | — | — | — | — | 100 | 100 | — | — |
| Crosslinking agent | | | | | | | | | | | |
| Bisphenol AF | 1.5 | 1.5 | 1.5 | 1.5 | 1.5 | 1.5 | 1.5 | 2 | 2 | 1 | 1 |
| Crosslinking accelerator | | | | | | | | | | | |
| DBU-B | 0.3 | 0.3 | 0.3 | 0.3 | 0.3 | 0.3 | 0.3 | 0.6 | 0.6 | — | — |
| VC50 | — | — | — | — | — | — | — | — | — | 1.5 | 1.5 |
| Acid acceptor | | | | | | | | | | | |
| Magnesium oxide | 3 | 3 | 3 | 3 | 3 | 3 | 3 | 3 | 3 | 3 | 3 |
| Filler | | | | | | | | | | | |
| Carbon black 1 | 20 | 20 | 20 | 20 | 20 | 20 | 20 | — | — | 20 | 20 |
| Carbon black 2 | — | — | — | — | — | — | — | 13 | 13 | — | — |
| Metal compound | | | | | | | | | | | |
| Calcium hydroxide | 6 | 3 | — | — | — | — | — | 6 | 3 | 6 | 3 |
| Magnesium silicate | — | — | 3 | — | — | 1.5 | — | — | — | — | — |
| Calcium silicate | — | — | — | 3 | — | — | 1.5 | — | — | — | — |
| Aluminum silicate | — | — | — | — | 3 | — | — | — | — | — | — |
| Pure water | — | — | — | — | — | 1.5 | 1.5 | — | — | — | — |

TABLE 4

| | Comparative Example | | | | | | | | | | |
|---|---|---|---|---|---|---|---|---|---|---|---|
| | 1 | 2 | 3 | 4 | 5 | 6 | 7 | 8 | 9 | 10 | 11 |
| Crosslinking characteristics | | | | | | | | | | | |
| Temperature (° C.) | 170 | 170 | 170 | 170 | 170 | 170 | 170 | 160 | 160 | 170 | 170 |
| ML (kgf) | 0.2 | 0.1 | not cross-linked | 0.2 | not cross-linked | not cross-linked | not cross-linked | 0.3 | 0.3 | 0.2 | 0.2 |
| MH (kgf) | 2.7 | 2.3 | | 1.9 | | | | 1.8 | 1.8 | 3.2 | 2.8 |
| T10 (min) | 2.9 | 4.6 | | 6.7 | | | | 5.0 | 10.7 | 1.8 | 2.3 |
| T90 (min) | 4.3 | 7.1 | | 15.8 | | | | 10.0 | 18.7 | 2.7 | 3.5 |
| Crosslinking conditions | | | | | | | | | | | |
| Press Crosslinking | 170° C. × 10 min | 170° C.× 10 min | — | 170° C. × 10 min | — | — | — | 160° C.× 45 min | 160° C. × 45 min | 170° C. × 10 min | 170° C. × 10 min |
| Secondary Crosslinking | 230° C. × 24 hr | 230° C. × 24 hr | — | 230° C. × 24 hr | — | — | — | — | — | 230° C. × 24 hr | 230° C. × 24 hr |
| Heating characteristics | | | | | | | | | | | |
| CS (200° C. × 72 hr) | 22 | 22 | — | 25 | — | — | — | — | — | 17 | 16 |
| CS (100° C. × 72 hr) | — | — | — | — | — | — | — | 24 | 22 | — | — |
| Resistance to biodiesel fuel | 93 | 55 | — | 27 | — | — | — | 110 | 55 | 78 | 45 |

INDUSTRIAL APPLICABILITY

According to the present invention, a polyol-crosslinkable fluorine-containing elastomer composition which is excellent in fuel resistance (especially biofuel resistance), chemical resistance and solvent resistance (especially resistance to an acidic solvent) and is crosslinkable at the same crosslinking speed as in the case of using calcium hydroxide in a necessary amount even without blending calcium hydroxide (or even if an amount of calcium hydroxide is decreased) which increases the crosslinking speed but accelerates oxidation and deterioration of a fuel.

The invention claimed is:

1. A fluorine-containing elastomer composition comprising a polyol-crosslinkable fluorine-containing elastomer, a polyol crosslinking agent and a silicate of an alkali metal.

2. The fluorine-containing elastomer composition of claim 1, wherein the silicate of an alkali metal is sodium silicate or a salt hydrate thereof.

3. The fluorine-containing elastomer composition of claim 1, wherein the silicate of an alkali metal is a salt hydrate of sodium silicate, potassium silicate, a salt hydrate of potassium silicate, lithium silicate or a salt hydrate of lithium silicate.

4. The fluorine-containing elastomer composition of claim 1, wherein the silicate of an alkali metal is potassium silicate, a salt hydrate of potassium silicate, lithium silicate or a salt hydrate of lithium silicate.

5. The fluorine-containing elastomer composition of claim 1, containing the silicate of an alkali metal in an amount of 0.1 to 10 parts by mass based on 100 parts by mass of the fluorine-containing elastomer.

6. The fluorine-containing elastomer composition of claim 1, containing the silicate of an alkali metal in an amount of 0.2 to 7 parts by mass based on 100 parts by mass of the fluorine-containing elastomer.

7. The fluorine-containing elastomer composition of claim 1, containing the silicate of an alkali metal in an amount of 0.5 to 3 parts by mass based on 100 parts by mass of the fluorine-containing elastomer.

8. The fluorine-containing elastomer composition of claim 1, wherein a crosslinked rubber sheet prepared from the fluorine-containing elastomer composition exhibits a rate of change in volume of 10% or less after dipping in biodiesel fuel containing 2% by volume water at 125° C. for 504 hours.

* * * * *